United States Patent [19]

Bilinski et al.

[11] Patent Number: 5,035,902
[45] Date of Patent: Jul. 30, 1991

[54] FOAM STABILIZING PROTEINASE

[75] Inventors: Carl Bilinski; Hoyeon Choi, both of London; Keith Mussar, Kitchener, all of Canada

[73] Assignee: Labatt Brewing Company Limited, London, Canada

[21] Appl. No.: 364,168

[22] Filed: Jun. 12, 1989

[51] Int. Cl.$^5$ ............................................. C12G 1/00
[52] U.S. Cl. ................................. 426/12; 426/29; 426/63; 426/329
[58] Field of Search .................. 426/12, 13, 63, 62, 426/29, 329; 435/219, 223, 224, 921

[56] References Cited

U.S. PATENT DOCUMENTS

| | | | |
|---|---|---|---|
| 3,366,483 | 1/1968 | Stone | 426/63 |
| 3,597,219 | 8/1971 | Wildi et al. | 426/63 |
| 3,712,820 | 1/1973 | Walmsley et al. | 426/13 |
| 3,740,233 | 6/1973 | Nelson et al. | 426/12 |
| 4,038,419 | 7/1977 | Ferns | 426/63 |
| 4,181,742 | 1/1980 | Horiuchi et al. | 426/12 |
| 4,746,517 | 5/1988 | Ducroo | 426/62 |

OTHER PUBLICATIONS

Koji "Extracellular Production of Yeast Protease" Journal Agr. Biol. Chem. 1971, vol. 35, pp. 1633–1635, Chem. Abstract 76(3)70994v.

Primary Examiner—R. B. Penland
Attorney, Agent, or Firm—Beveridge, DeGrandi & Weilacher

[57] ABSTRACT

The present invention relates to processes for enzymatically hydrolysing protein in a protein-containing liquid, comprising the step of hydrolysing the protein with an enzymatic amount of a Candida enzyme preparation, in the absence of non-indigenous beer wort protein concentrations sufficient to substantially increase foam stability in the liquid. The invention also extends to a proteolytic, Candida enzyme preparation substantially free of beer wort proteins.

29 Claims, No Drawings

FOAM STABILIZING PROTEINASE

FIELD OF THE INVENTION

The present invention relates to a foam stabilizing proteinase particularly useful in the production of malt beverages and especially beer.

BACKGROUND OF THE INVENTION

The foam or head that is normally present in a glass of beer is an important feature of the product, and it has been found that many consumers, when judging the quality of a beer, consider that this is one of the more important factors. Much the same is also true of other beverages on which a head is formed. A foam head is of good quality if it has a number of attributes, among which are stability, the ability to form lacing (that is a lace like pattern of bubbles that is left on the side of the glass after the liquid beer or other beverage has been wholly or largely consumed), good color (usually white) and a preponderance of small substantially uniform sized bubbles.

The nature of the foam head on a glass of beer or other beverage depends principally on two factors, one being the constitution or composition of the beverage itself and the other being the way in which the beverage is dispensed. At least inasfar as its application to beer is concerned, the present invention is primarily concerned with the former of these two factors.

A typical brewing process yields beer with a significant content of unassimilated proteins, and, even though most of these proteins originate from malt, some are derived from hops and from the yeast culture used. Certain of such proteins present in beer have been implicated in foam stabilization, such as cystine-poor proteoses, while others (eg albumins, barley hordeins, cystine-rich proteoses) are known to contribute to undesirable haze formation in beer. To some degree, beer haze can be dealt with through the use of various purely physical methods such as filtration or centrifugation. The drawbacks of clarifying beer using only such methods are well known, particularly in association with beverages in which the precipitable proteins are present in solution, and above all if they are of widely differing molecular weights in which case filtration can be extremely difficult and centrifugation of limited value. Moreover, this limited clarification does little, if anything to secure against recurrent haze formation on subsequent storage.

Reversible haze formation in beer, for example, results when even carefully filtered beer is stored at lower temperatures, and is referred to as chill haze formation. Various and diverse approaches exist for dealing with this aspect of the haze problem, and these come under the broad category of chillproofing the beverage.

The above mentioned physical methods are sometimes augmented through the use of adsorbent materials. By way of example, it is known that silica adsorbents or silica hydrogels added to beer adsorb offending proteins which can be removed during primary and/or secondary filtration of the beer. Another example of the use of adsorbents involves contacting the beer with polyvinylpolypyrrolidone to remove the polyphenols that are indigenous to beer and that are believed to participate in the protein condensation reactions that result in chill haze formation.

Conventional chillproofing processes more commonly involve the addition of an enzyme preparation to the beer and especially ales, either alone or in combination with one or more of the above mentioned processes. Enzymatic hydrolysis as applied to the chill haze problem, produces the desired two fold effects of: eliminating or at least substantially reducing the permanent haze and thereby faciliting subsequent filtration or centrifugation steps; and, acting on dissolved or colloidal macromolecules, degrading the proteinaceous components into small peptides, thereby increasing their solubility and impeding subsequent precipitation reactions and thus reducing or even eliminating latent haze formation, especially chill haze formation. Known enzymatic systems which are used for chillproofing include papain, bromelain, ficin, pepsin, and certain microbial proteases.

The most commonly used commercial enzymes are of plant origin and are known to have been used in brewing since almost the beginning of the century. In spite of some well known shortcomings, these products continue to be used even today, and despite the availability of a number of microbial enzymes as alternatives. Current commercial practices therefore include the use of solutions rich in papain derived from Carica papaya (papaya), or rich in ficin derived from the latex of Fiscus glabrata (fig). Other vegetable materials less commonly used as a source of chill haze treating enzymes include mushrooms and barley.

There are, however, a variety of microbial enzymes known to have application in dealing with the chill haze problems associated with beer. U.S. Pat. No. 4,038,419, for example, relates to the use of a microbial protease derived from Streptomyces, which is auto destructive, can be sterilized using dry heat, is active over a wide range of pH, and is effective in the same way as the papain and other vegetable protease mentioned hereinabove.

U.S. Pat. No. 3,712,820; 3,795,745; and 3,711,292 also teach the use of various neutral and alkaline proteases in connection with the production of beer. These patents are particularly concerned with the use of these enzymes to enhance the release of yeast nutrients from barley without having to rely on the addition of malt, or at least without having to rely on the addition of as much malt as is required in the production of more conventional products. Concomitant benefits associated with chill haze improvements are also noted. Although these three patents suggest that the other properties of the beer are not adversely effected by way of this treatment of the beer, the foam SIGMA values reported in the examples are consistently lower than untreated control beers, and in some cases sufficiently so as to suggest a significant reduction in foam stability as a result of the treatments in question.

U.S. Pat. No. 3,740,233, also makes that point that commercial chillproofing enzymes, and in particular the use of papain, resulted in a marked deterioration of foam stability in treated beers. This patent notes that in addition to producing improved stability against chill haze formation, such treatments must not adversely affect the quality of finished beers, particularly as regards their flavour and foam stability. According to this same patent, the foam stability can be preserved notwithstanding the chill haze treatment when acidic protease enzymes derived from Mucor pusillus Lindt are added to the fermenter in combination with a second enzyme treatment using either the same Mucor enzymes or commercial chill haze (papain) enzymes added to primary filtered beer.

A seemingly similar type of approach is taken in U.S. Pat. No. 4,181,742 which teaches that the addition of chill proofing enzymes results in the production of beverages which have a tendency to gush when opened. According to the disclosure of this patent, this can be overcome through the use of a pepsin inhibitor to inhibit a microbial acidic protease that is used in conjuction with conventional chill proofing enzymes that are employed to control chill haze in known manner. The inhibition of the proteolytic action is taught as essential to this purpose. In this regard it is known in the art that the presence of active microbial acid proteases in beer can prejudice foam stability, as pointed out in Nielsen, H. et al, Brauwelt International, 1988, "Damage to beer foam by enzymes from yeast", and earlier works cited in that article, by Maddox et al, Proc. EBC, 1955, S. 315 and Biochem. J. 117, 843, 1970.

CRC Critical Reviews in Biotechnology, volume 8, issue 2, 1988, in an article entitled "APPLICATION OF EXTRACELLULAR YEAST PROTEASES IN BEER STABILIZATION" and an earlier article entitled "APPLICABILITY OF YEAST EXTRACELLULAR PROTEINASES IN BREWING: PHYSIOLOGICAL AND BIOCHEMICAL ASPECTS" Applied Environmental Microbiology, volume 53, number 3, 1987, both teach that a combination of concentrated wort proteins and an extracellular protease produced by Torulopsis sp., result in improvements in chill haze control, without detrimental effects to the foam stability of the resulting beer. The later of these two articles contains data showing that the foam stability is directly attributable to the presence of the concentrated wort proteins. The use of various proteins is known for this purpose, as is disclosed in EU 138 341, which goes on to observe that the addition of such proteins as a rule results in increased chill haze formation in the protein supplemented product, in the absence of appropriate chillproofing enzymes. Of the proteins reported in that patent specification, only hydrolysed egg albumin could be used on its own to improve foam stability without giving rise to concomitant chill haze problems.

There remains a need for improved chill haze and foam stabilizing treatments for, inter alia, malt beverages.

SUMMARY OF THE INVENTION

The present invention relates to a process for enzymatically hydrolysing protein in a protein-containing liquid. This process comprises the step of hydrolysing the protein with an enzymatic amount of a Candida enzyme preparation, in the absence of non-indigenous beer wort protein concentrations sufficient to substantially increase foam stability in the liquid.

In accordance with one particular aspect of the present invention there is provided a process for the production of a protein-containing liquid and in particular a beverage, which process comprises the step of hydrolysing chill-haze-producing proteins contained in the protein-containing beverage with a proteolytic amount of proteolytic, Candida enzyme preparation in the absence of non-indigenous beer wort protein concentrations sufficient to substantially increase foam stability in the beverage.

In accordance with another aspect of the present invention there is provided a process for enhancing foam head stability in a protein-containing liquid, and especially a beverage, adapted to produce a foam head. In this aspect the present process comprises the step of reacting the beverage under protein hydrolysing conditions, which beverage is substantially free from proteolytic enzyme inhibiting concentrations of alcohol (eg the preparation is preferably added during fermentation and especially preferably by adding the enzyme concurrently with the pitching of yeast into the wort), with an enzymatic amount of a proteolytic, Candida enzyme preparation in the absence of non-indigenous beer wort protein concentrations sufficient to substantially increase foam stability in the beverage. This process is especially preferred for use in conjunction with the production or treatment of carbonated beverages.

The processes set forth hereinabove relate in general to protein-containing liquids, and in particular to liquid comestibles including potable beverages. Such beverages include, by way of example and without in any way limiting the generality of the forgoing, malt beverages. The present invention is useful in connection with the production of beer, and especially alcoholic beers produced using malt.

The expression proteolytic, Candida enzyme preparation, as used herein, is in reference to enzymatic preparations having, in particular, proteolytic activity and moreover being derived, whether directly or indirectly, from one or more naturally proteolytic enzyme producing species of the genus Candida. Such preparations can be derived directly by culturing the one or more species in or on a proteolytic enzyme inducing medium. Note that the production of proteolytic enzymes is not repressed in beer wort under normal fermentation conditions, or even by the levels of yeast assimilable nitrogen present in brewers wort. Indirect methods are mediated, for example, through the transfer of genetic material originating from the Candida species, to another species or even genus. The species or genus receiving the transferred genetic material is then cultured in the same manner as mentioned above, to produce the proteolytic enzymes. In either case the enzymes may be processed further if desired, in order to concentrate and or purify the preparation.

In accordance with one aspect, a preferred source of enzyme is *Candida magnoliae*, (formerly known as *Torulopsis magnoliae*), Strain ATCC 12573. This strain is available to the public through the American Type Culture Collection, currently at 12301 Parklawn Drive, Rockville, Md., 20852-1776. The strain is recognized in the ATCC catalog as having special utility in the production of polyhydric alcohols.

A culture filtrate produced by culturing this strain in a barley malt beer wort was prepared, and an enzyme preparation was produced. The culture filtrate was found to contain at least two distinct extracellular acid proteases, either of which can be used alone in an enzyme preparation, or in combination with one another.

In accordance with yet another aspect of the present invention there is included a product, comprising a proteolytic, Candida enzyme preparation substantially free of beer wort proteins. Preferably the species is *Candida magnoliae*, and in particular *Candida magnoliae* strain ATCC 12573 enzyme. Especially preferred are enzymes that are readily adsorbed on an hydroxylapatite support. A preparation which comprises at least one extracellular *Candida proteinase* is preferred, and acid proteinases in particular are useful in the process of the invention, when the liquid is acidic. Although the preparation can take many forms, it is preferably a preparation of discrete enzymes, ie. substantially free from impurities, and especially beer wort proteins.

The presence of beer wort proteins in the preparation, especially in the concentrations mentioned in relation to the processes described hereinabove, has surprisingly adverse effects. In connection with the present invention, the use of concentrated beer wort proteins to bolster beer foam stability so as to offset the detrimental effects on foam stability of adding a chill proofing enzyme, has been found to reduce both the extent of chill proofing ability and the surprising foam head stabilizing ability of the Candida enzyme preparations useful herein. This finding is in direct contradiction to the findings set forth in CRC Critical Reviews in Biotechnology, volume 8, issue 2, 1988, in an article entitled "APPLICATION OF EXTRACELLULAR YEAST Proteinases IN BEER STABILIZATION" and an earlier article entitled "APPLICABILITY OF YEAST EXTRACELLULAR PROTEINASES IN BREWING: PHYSIOLOGICAL AND BIOCHEMICAL ASPECTS" Applied Environmental Microbiology, volume 53, number 3, 1987. As noted earlier, both references teach that a combination of concentrated wort proteins and an extracellular proteinase produced by Torulopsis sp., result in improvements in chill haze stability, without detrimental effects to the foam stability of the resulting beer. The later of these two articles contains data showing that the foam stability is directly attributable to the presence of the concentrated wort proteins, which is consistent with expectations arising out of the art, that such proteins, generally speaking, improve the foam stability of the beer.

It has now been found, and this finding forms the basis for the present invention, that proteolytic, Candida enzyme preparations show improved chill proofing ability and a surprising ability to improve foam stability, in the absence of any concentration of beer wort proteins sufficient to substantially stabilize the foam.

DETAILED DESCRIPTION OF A PREFERRED EMBODIMENT

EXAMPLE:

A series of typical fermentations of brewers worts were carried out under various experimental treatments as described hereinbelow, in Table 1. Each of the fermentations were carried out in the absence of any substantial amounts of non-indigenous beer wort proteins. Proteolytic enzymes were added at pitching and finishing as indicated below, and were sourced from a commercial supply in the case of conventional chillproofing enzyme and from *Candida magnoliae* strain 12573, in the case of enzyme preparations in accordance with the present invention. Foam stability was measured following finishing of the resulting beers, in known manner, and is presented herein below in Nibem units.

TABLE 1

| Fermentation # | Enzyme | Amount (pitching) | Amount (finishing) | Foam |
| --- | --- | --- | --- | --- |
| 754 (control) | commercial | none | .0175* | 175 |
| 755 (control) | none | none | none | 218 |
| 756 | Strain 12573 | none | 1.0 A | 227 |
| 757 | Strain 12573 | none | 1.0 NA | 226 |
| 758 | Strain 12573 | 0.5 A | none | 240 |
| 759 | Strain 12573 | 0.5 N | none | 221 |
| 760 | Strain 12573 | 1.0 A | none | 242 |

TABLE 1-continued

| Fermentation # | Enzyme | Amount (pitching) | Amount (finishing) | Foam |
| --- | --- | --- | --- | --- |
| 761 | Strain 12573 | 1.0 NA | none | 202 |

*amount in mls per liter of wort, of a commercial enzyme preparation which can be used and is sold under the trademark CEREVASE and available from Phizer A—proteolytically active enzyme preparation of the present invention, measured in protease units per ml.
NA—protease units per ml, of enzyme of the present invention, which was inactivated prior to addition to the fermentation by boiling in a water bath for twenty minutes.

The eight fermentations were performed with commercial ale yeasts in ten liter lots, using a 12 degree Plato brewers wort.

Referring now to Table 1 and specifically to the data pertaining to Fermentation number 754, there is shown the effects, in a typical, conventional brewing process, on the foam stability that results when a commercial chillproofing enzyme is added, at normal commercial levels, during the finishing operation of the beer. This addition of conventional chillproofing proteinase enzyme results in a significant reduction in beer foam stability.

By way of comparison, treatments of beer wort which have no significant effect on the foam stability show substantially greater foam stability than does Fermentation number 754. Fermentation 755 for example, was carried out without the addition of any exogenous proteolytic enzymes, and had a foam stability of 218 as compared with 175 for Fermentation number 754. Fermentations 757, 759 and 761 all show that inactivation of the proteolytic activity of an enzyme preparation of the present invention results in foam stabilities that are fully comparable with that of the untreated control, 755.

Moreover, the addition of active enzyme preparations of the present invention are effective only if added prior to the finishing operation. As shown on comparison of Fermentations 756 and 757, there is no significant difference between proteolytically active and inactive enzyme preparations of the present invention when the addition of the enzyme is delayed until the finishing operation. In general, the process of the present invention is carried out in the absence of denaturing or otherwise proteinase enzyme inhibiting concentrations of alcohol. which can be readily determined by the person skilled in the art without undue experimentation.

By way of comparison with the foregoing, the addition of proteolytically active enzyme preparations at the time the wort is pitched with yeast, in accordance with the present invention, results in significant improvements in foam stability, notwithstanding the absence of any substantial concentrations of non-indigenous beer wort proteins. This effect is shown by fermentations 758 and 760. Note that the relative levels of foam stability associated with these two fermentations exceeds the levels of foam stability associated with fermentations that were not treated with active proteolytic enymes, (the bar chart in FIG. 1 overlys a cross-hatched region mapping the range of foam stabilities associated with such "untreated" fermentations, and the foam stabiliies for fermentations 758 and 760 extend significantly beyond the upper limit of that range). Also note that the foam stability of beverages produced from fermentations 758 and 760 very substantially exceeds the foam stability of the beverage produced in the course of fermentation 754, wherein conventional commercial chill-proofing proteases were added during the finishing operation.

I claim:

1. A process for the production of a protein-containing beverage, comprising the step of hydrolysing chill-haze-producing proteins contained in the protein-containing beverage with a proteolytic amount of proteolytic, Candida enzyme preparation in the absence of non-indigenous beer wort protein concentrations sufficient to substantially increase foam stability in the beverage.

2. The process according to claim 1 wherein the enzyme preparation comprises at least one extracellular *Candida proteinase*.

3. The process according to claim 2 wherein the preparation is substantially free from beer wort proteins.

4. The process according to claim 3 wherein the enzyme preparation is a preparation of discrete enzymes.

5. The process according to claim 1 wherein said enzyme preparation comprises at least one Candida acid proteinase.

6. The process according to claim 1 wherein the beverage is a malt beverage.

7. The process according to claim 6 wherein the beverage is a beer.

8. The process according to claim 7 wherein the beer is an alcohol-containing beer.

9. The process according to claim 1 wherein the beverage is a carbonated beverage.

10. The process according to claim 1 wherein the Candida enzyme is a *Candida magnoliae* enzyme.

11. The process according to claim 10 wherein the *Candida magnoliae* enzyme is a *Candida magnoliae* strain ATCC 12573 enzyme.

12. The process according to claim 11 wherein the enzyme is readily absorbed on an hydroxylapatite support.

13. The process according to claim 12 wherein the *Candida magnoliae* strain ATCC 12573 enzyme preparation comprises at least one extracellular acid endoprotease.

14. A process for enhancing foam head stability in a protein-containing beverage which produces a foam head, comprising the steps of reacting a beverage that is substantially free from proteinase inhibiting concentrations of alcohol, under protein hydrolysing conditions with an enzymatic amount of a proteolytic, Candida enzyme preparation in the absence of non-indigenous beer wort protein concentrations sufficient to substantially increase foam stability in the beverage.

15. The process according to claim 14 wherein the enzyme preparation is added to the beverage during fermentation thereof.

16. The process according to claim 15 wherein the enzyme preparation is added to the beverage upon pitching thereof with yeast.

17. The process according to claim 14 wherein the enzyme preparation comprises at least one extracellular *Candida proteinase*.

18. The process according to claim 17 wherein the preparation is substantially free from beer wort proteins.

19. The process according to claim 18 wherein the enzyme preparation is a preparation of discrete enzymes.

20. The process according to claim 14 wherein said enzyme preparation comprises at least one Candida acid proteinase.

21. The process according to claim 14 wherein the beverage is a malt beverage.

22. The process according to claim 21 wherein the beverage is a beer.

23. The process according to claim 22 wherein the beer is an alcohol-containing beer.

24. The process according to claim 14 wherein the beverage is a carbonated beverage.

25. The process according to claim 14 wherein the Candida enzyme is a *Candida magnoliae* enzyme.

26. The process according to claim 25 wherein the *Candida magnoliae* enzyme is a *Candida magnoliae* strain ATCC 12573 enzyme.

27. The process according to claim 26 wherein the enzyme is readily adsorbed on an hydroxylapatite support.

28. The process according to claim 27 wherein the *Candida magnoliae* strain ATCC 12573 enzyme preparation comprises at least one extracellular acid endoprotease.

29. A process for enzymatically hydrolysing protein in a protein-containing liquid, comprising the step of hydrolysing the protein with an enzymatic amount of a proteolytic, Candida enzyme preparation, in the absence of non-indigenous beer wort protein concentrations sufficient to substantially increase foam stability in the liquid.

* * * * *